United States Patent
Carlson et al.

(10) Patent No.: US 11,426,958 B2
(45) Date of Patent: Aug. 30, 2022

(54) 3D PRINTED END CAULS FOR COMPOSITE PART FABRICATION

(71) Applicant: The Boeing Company, Chicago, IL (US)

(72) Inventors: Lisa Christina Carlson, Auburn, WA (US); Scott Allen Boner, North Bend, WA (US); Khanh Mai Pham, Renton, WA (US); Mary Leann Parker, Lake Stevens, WA (US); Alicia Salcedo Medina, Seattle, WA (US); John A. Minerich, Spanaway, WA (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 15/992,889

(22) Filed: May 30, 2018

(65) Prior Publication Data

US 2019/0366653 A1     Dec. 5, 2019

(51) Int. Cl.
| | |
|---|---|
| B29C 70/54 | (2006.01) |
| B29C 70/44 | (2006.01) |
| B33Y 10/00 | (2015.01) |
| B33Y 50/02 | (2015.01) |
| B22F 10/10 | (2021.01) |
| B29C 64/153 | (2017.01) |
| B33Y 80/00 | (2015.01) |

(52) U.S. Cl.
CPC ............ *B29C 70/543* (2013.01); *B22F 10/10* (2021.01); *B29C 64/153* (2017.08); *B29C 70/443* (2013.01); *B33Y 10/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 3,048,537 A * | 8/1962 | Pall | C08J 9/24 210/510.1 |
| 9,427,899 B2 | 8/2016 | Kennedy et al. | |
| 2003/0075259 A1* | 4/2003 | Graham | B29C 66/1122 156/94 |
| 2005/0208168 A1* | 9/2005 | Hickerson | B29C 64/245 425/174.4 |
| 2006/0249626 A1* | 11/2006 | Simpson | B64C 3/20 244/123.1 |
| 2007/0096368 A1* | 5/2007 | Hanson | B29C 70/446 264/314 |

(Continued)

FOREIGN PATENT DOCUMENTS

WO     9729901 A1     8/1997

OTHER PUBLICATIONS

Webster's Online definition of "filled.".*

(Continued)

*Primary Examiner* — Christopher T Schatz
(74) *Attorney, Agent, or Firm* — Duft & Bornsen, PC

(57) ABSTRACT

Systems and methods are provided for composite part fabrication. One embodiment is a method for fabricating a composite part. The method includes selecting an end caul comprising a structure of sintered material surrounding volumes of unsintered particles, creating a laminate comprising fibers within a resin matrix, placing the end caul in contact with an end of the laminate, and processing the laminate.

20 Claims, 13 Drawing Sheets

(56) References Cited

U.S. PATENT DOCUMENTS

| | | | | |
|---|---|---|---|---|
| 2011/0195230 A1* | 8/2011 | Hanson | ............... | B29C 70/543 |
| | | | | 428/174 |
| 2016/0101470 A1* | 4/2016 | Kamakura | ............ | B29C 64/153 |
| | | | | 419/5 |
| 2017/0197246 A1* | 7/2017 | Wachter | .................. | C22C 45/10 |
| 2018/0229401 A1* | 8/2018 | Gunner | .................. | B22F 10/20 |

OTHER PUBLICATIONS

NetComposites; Repair Tooling caul plates; https://netcomposites.com/guide-tools/guide/repair/repair-tooling; Mar. 26, 2018.
TetraShell; materialise; Jumpstart your investment casting process; www.materialise.com/en/manufacturing/3d-printing-technology/tetrashell; Mar. 26, 2018.

* cited by examiner

3D PRINTED END CAULS FOR COMPOSITE PART FABRICATION

FIELD

The disclosure relates to the field of composite parts, and in particular, to fabrication of composite parts.

BACKGROUND

Caul plates may be utilized during fabrication of composite parts in order to facilitate conformance of the composite parts with desired shapes. For example, end cauls may be placed at ends of a long laminate in order prevent bow waves, warpage porosity, and other possible out of tolerance conditions at temperatures and pressures involved in the curing process. An effectively designed end caul includes many tight radii of curvature in order to adequately distribute forces applied during curing. Metal end cauls are infeasible in that they are expensive to cast and/or machine, and may be unable to provide tight enough radii of curvature to prevent the formation of bow waves of resin and/or laminate during the curing process. Composite end cauls may be utilized to facilitate the fabrication process, but composite end cauls are expensive to fabricate, may damage bagging which is used during the curing process, and are subject to substantial wear across cure cycles. Hence, composite end cauls may be subject to frequent replacement.

Therefore, it would be desirable to have a method and apparatus that take into account at least some of the issues discussed above, as well as other possible issues.

SUMMARY

Embodiments described herein provide a three dimensional (3D) printed end cauls that may include internal volumes of sintered and unsintered material. These end cauls may be reliably printed from metal, ceramic, or other materials, and the printing process enables detailed features and tight radii to be accurately reproduced in accordance with design parameters. This enhances the ability of the end cauls to be used as Outer Mold Line (OML) tooling. Furthermore, 3D printed metal designs may be rapidly updated and revised without incurring substantial tooling costs.

One embodiment is a method for fabricating a composite part. The method includes selecting an end caul comprising a structure of sintered material surrounding volumes of unsintered particles, creating a laminate comprising fibers within a resin matrix, placing the end caul in contact with an end of the laminate, and processing the laminate.

A further embodiment is a method for fabricating an end caul for a composite part. The method includes three dimensional (3D) printing an end caul by iteratively depositing a layer of particles of material in a shape defined by a Numerical Control (NC) program, sintering a boundary of the layer of particles while leaving unsintered particles within the layer by selectively controlling a heater, and initiating deposition of a next layer while the unsintered particles remain unsintered.

A further embodiment is a non-transitory computer readable medium embodying programmed instructions which, when executed by a processor, are operable for performing a method. The method includes selecting an end caul comprising a structure of sintered material surrounding volumes of unsintered particles, creating a laminate comprising fibers within a resin matrix, placing the end caul in contact with an end of the laminate, and processing the laminate.

Yet another embodiment is an apparatus. The apparatus includes an end caul for supporting a laminate during curing of the laminate into a composite part. The end caul includes a base that contacts a portion of the laminate and includes ridges which prevent bow waves from forming in the laminate during curing of the laminate, and a vertical element that projects outward from the base and includes a curved upper surface. The base and the vertical element comprise a structure of sintered material surrounding volumes of unsintered particles.

Still another embodiment is a system. The system includes caul plates disposed atop a laminate, the laminate having fibers within a resin matrix. The system also includes an end caul for supporting a laminate during curing of the laminate into a composite part. The end caul includes a base that contacts a portion of the laminate and includes ridges which prevent bow waves from forming in the laminate during curing of the laminate. The end caul also includes a web that projects outward from the base and includes a curved upper surface. The base and the web comprise a structure of sintered material surrounding volumes of unsintered particles. The system also includes a vacuum bag disposed atop the caul plates and the end caul that includes an evacuation port which removes air during curing of the laminate.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
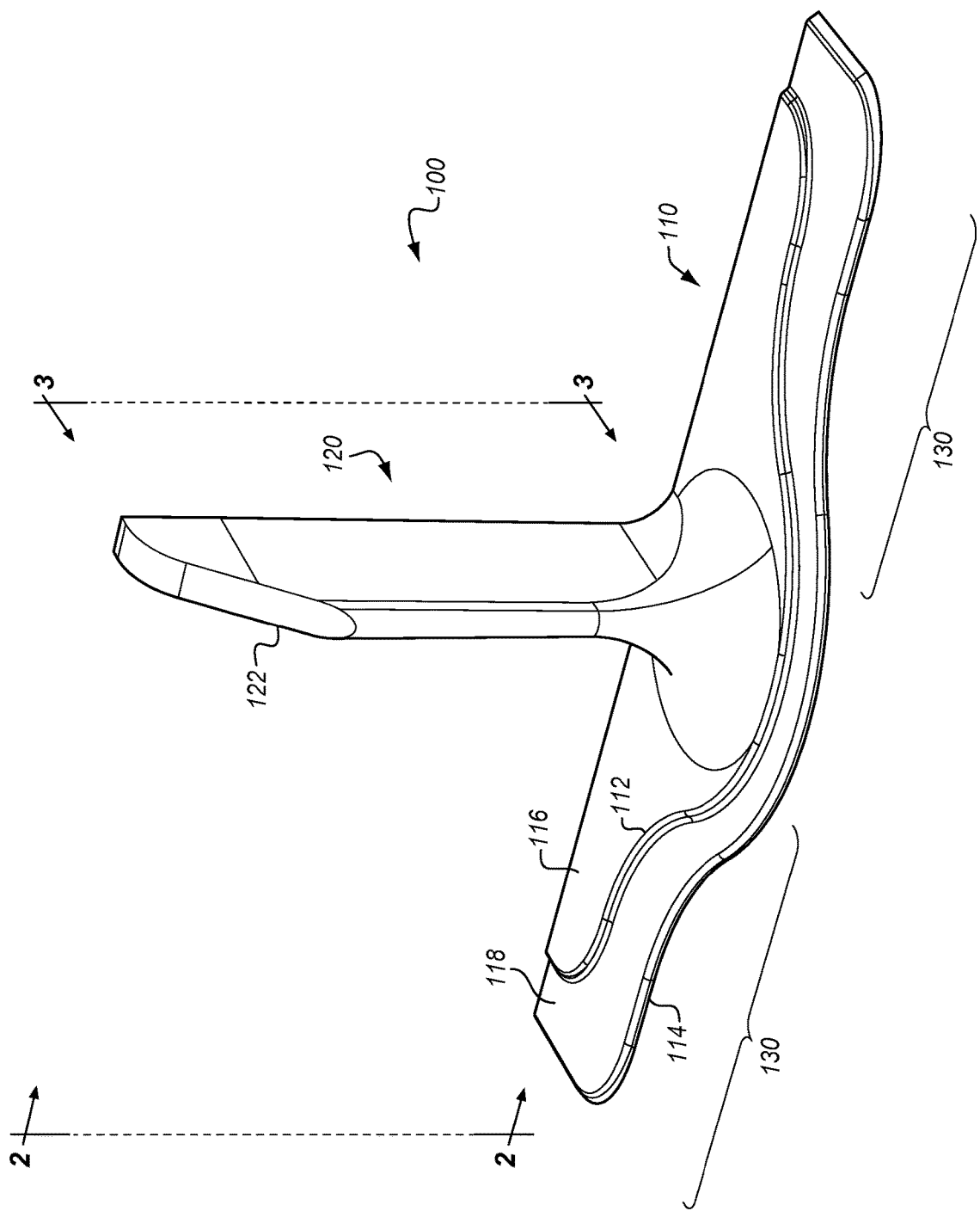
FIG. 1 is a perspective view of a 3D printed end caul in an illustrative embodiment.

FIG. 1 is a perspective view of a 3D printed end caul (i.e., end caul 100) in an illustrative embodiment. End caul 100 may be implemented as a metal structure (e.g., steel, aluminum, etc.), a ceramic structure, or even potentially a fiber reinforced composite that is dimensioned to provide mechanical support to a laminate that is being cured into a composite part. In this embodiment, end caul 100 provides support to an end of a blade stringer for an aircraft. That is, end caul 100 helps to support an upright web of a stringer and especially its end.

End caul 100 includes base 110, which provides mechanical support to a base (and/or flanges) of a laminate that will be cured. Base 110 includes flanges 130 which project laterally. End caul 100 also includes a vertical element in the form of web 120, which projects vertically from base 110 and provides mechanical support to a projecting portion of the blade stringer. End caul 100 includes multiple features that facilitate vacuum bag curing of a laminate precursor of the blade stringer into a composite part. For example, end caul 100 includes ridge 112 and ridge 114. Ridge 112 and ridge 114 divide base 110 into terrace 116 and terrace 118. When a vacuum bag is placed over end caul 100, these ridges prevent bow waves of pressure from reaching the laminate during curing because any bow waves are trapped at the ridges in the caul plate. Because there are multiple ridges, load applied by a vacuum bag is distributed across the ridges, and the frequency and magnitude of the bow waves is therefore reduced at each ridge. This may also help to reduce wrinkle formation at the vacuum bag, also resulting in reducing the frequency and magnitude of bow waves. In short, when base 110 has a "softer" and more gradual the footprint, the bow waves are eliminated more effectively. By reducing the frequency and magnitude of bow waves, resin pooling is reduced. This is beneficial because resin pooling in one region may result in a starved matrix that lacks resin, or has increased porosity, at other regions. Resin pooling is also undesirable because it may reduce the fiber volume of a composite part out of a desired tolerance range. Resin starved and high-porosity regions may also have a fiber volume that is out of a desired tolerance range.

Each terrace follows a predetermined contoured pattern, and the shape of each terrace may vary depending on how pressure is desired to be transitioned by end caul 100. For example, more terraces may be utilized to reduce the amount of pressure applied to each terrace by a vacuum bag. If many terraces are desired, the length or width of base 110 may be increased, in order to provide a longer "ramp" (i.e., transition zone) across which pressure is distributed. End caul 100 also includes upper surface 122, which is curved to provide a smooth surface that will not rip or tear a vacuum bag when curing temperatures (e.g., hundreds of degrees Fahrenheit) and pressures (e.g., ninety pounds per square inch) are applied. For example, upper surface 122 may comprise a chamfer that has a taper angle between thirty and forty-five degrees, and that also has rounded corners. These features of the taper angle help to prevent a vacuum bag from tearing when it is drawn around end caul 100.

Figure 2:
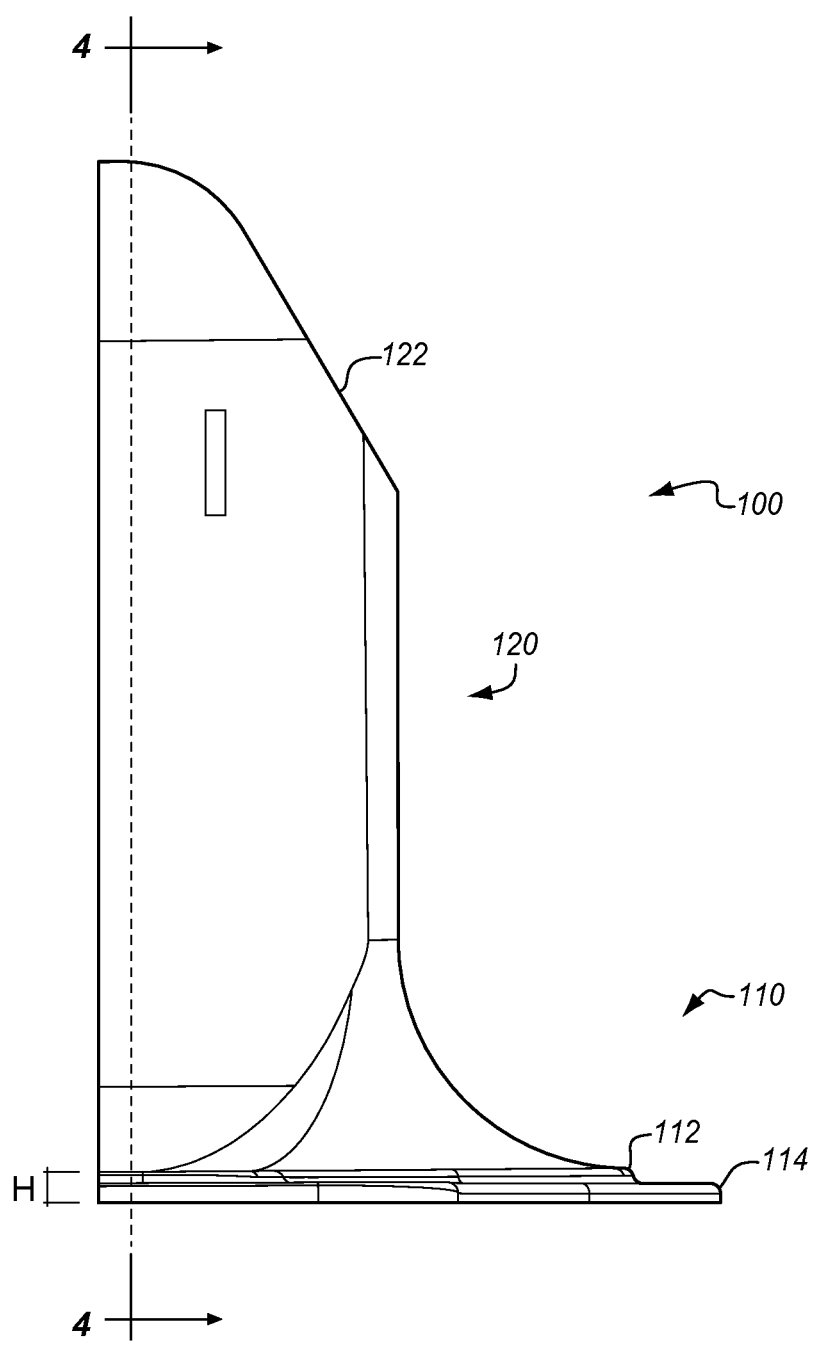
FIG. 2 is a side view of a 3D printed end caul in an illustrative embodiment.
Figure 3:
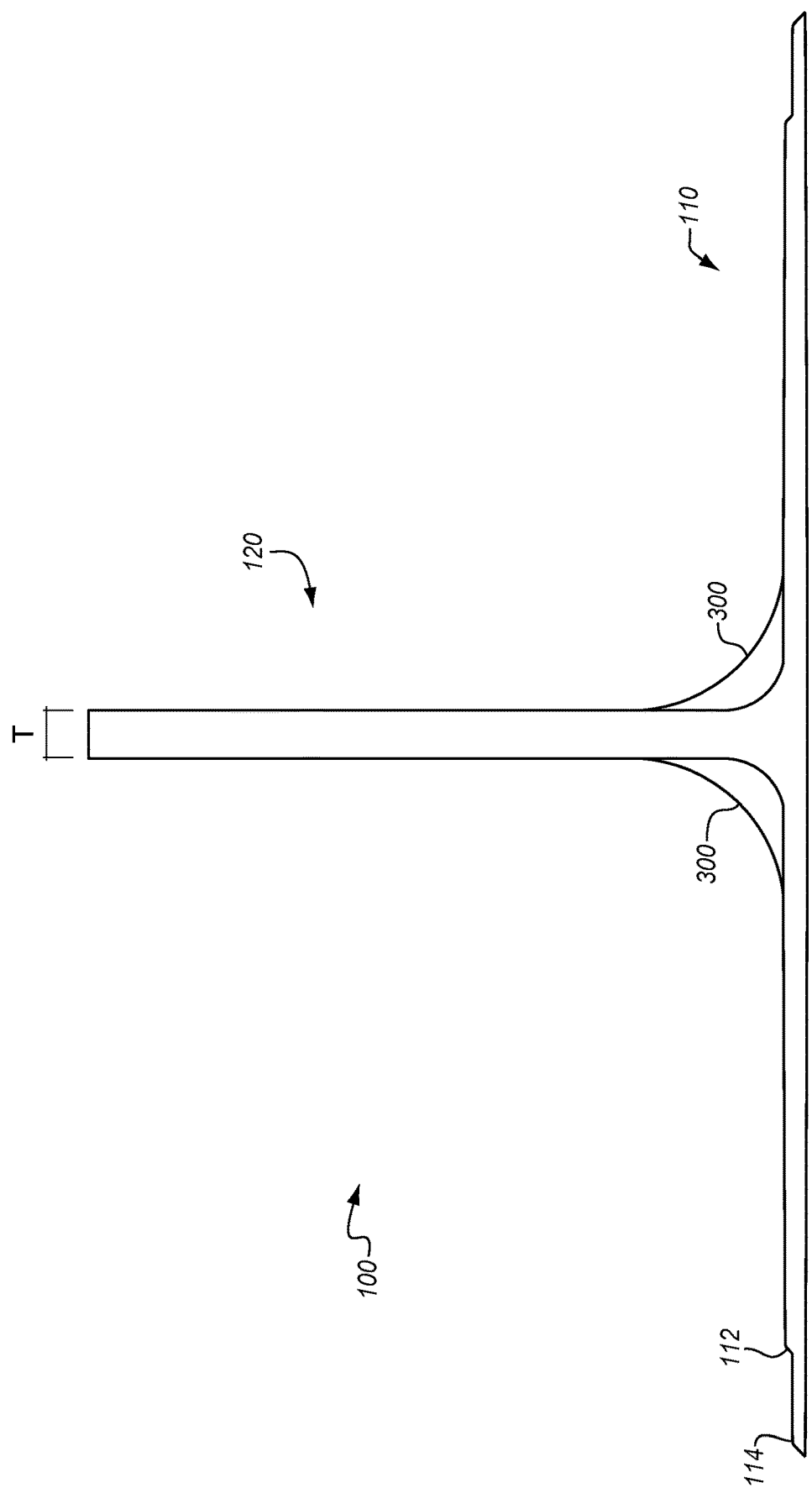
FIG. 3 is a front view of a 3D printed end caul in an illustrative embodiment.

FIG. 2 is a side view of end caul 100 that further illustrates the features discussed above. FIG. 2 corresponds with view arrows 2 of FIG. 1, and illustrates that base 110 has a height H that equals a height of a base of a laminate. FIG. 3 is a front view of end caul 100 that corresponds with view arrows 3 of FIG. 1, and calls out fillets 300, which provide a smooth transition from web 120 to base 110. This curvature provides a benefit during curing by preventing tearing of any vacuum bag placed over end caul 100. FIG. 3 also depicts face 310, which will contact an end profile of the laminate during curing and is placed against the end profile of the laminate during curing in order to provide mechanical support. While face 310 is shown flat, in further embodiments it is possible for face 310 to have a contour and/or facets within it, such as from top to bottom or from side to side. As shown in FIG. 3, web 120 of end caul 100 has a thickness T equal to a thickness of the laminate that will be cured. In further embodiments, thickness T may taper to match a thickness of a corresponding end of a laminate.

Figure 4:
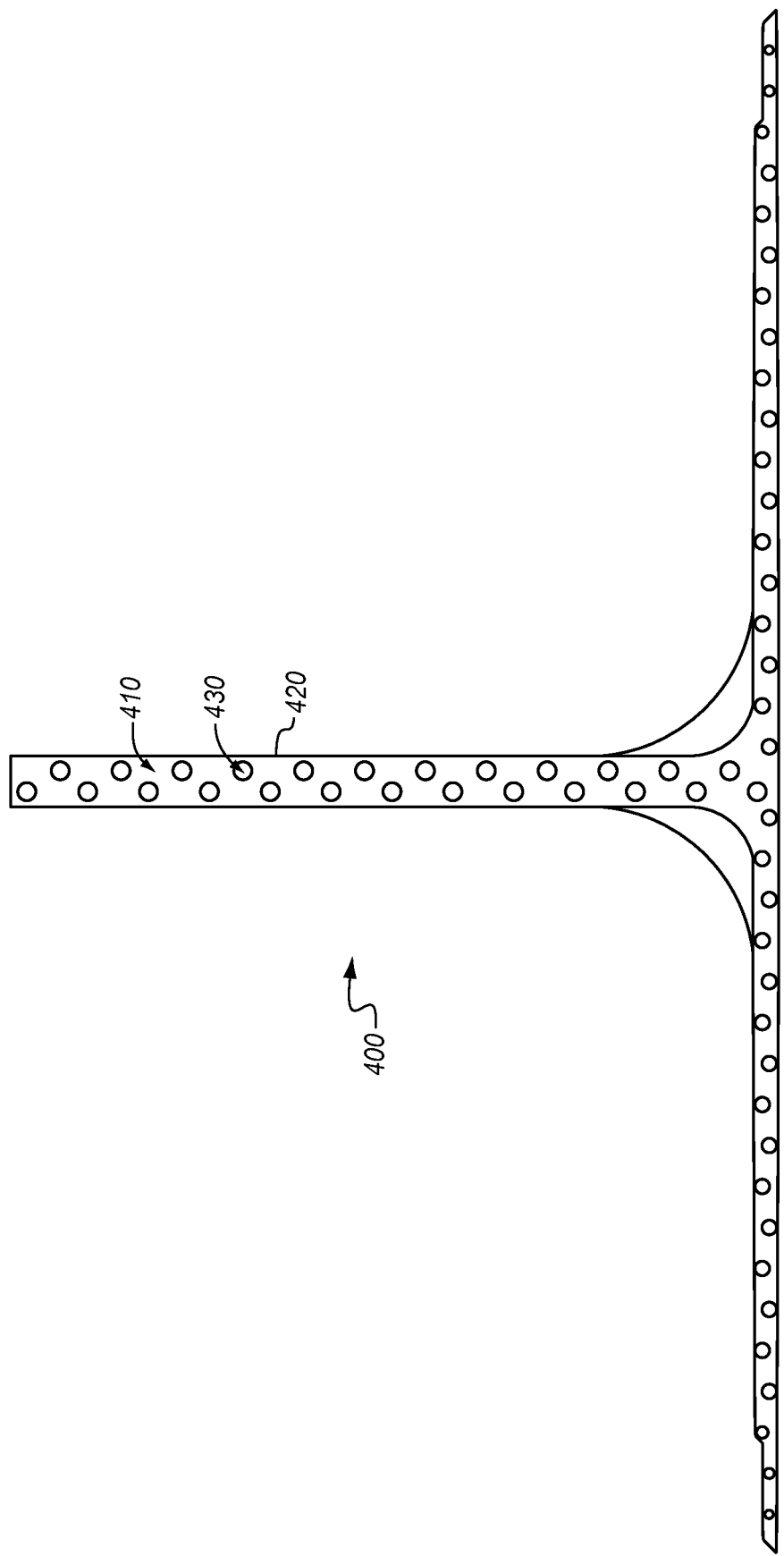
FIG. 4 is a cut through view of a 3D printed end caul in an illustrative embodiment.

FIG. 4 is a cut-through front view of end caul 100 and corresponds with view arrows 4 of FIG. 2. FIG. 4 illustrates features of end caul 100 that are internal to end caul 100, including structure 410 of sintered material (e.g., metal), and volumes 430 of unsintered particles (e.g., unsintered metal particles). In this embodiment, the volumes 430 are between two and five millimeters in diameter. Structure 410, which is solid, includes walls 420 of end caul 100. Walls 420 define the perimeter of end caul 100, and hence hide volumes 430 from viewing. Volumes 430 comprise hollowed-out areas within end caul 100 which are not visible from outside. The inclusion of volumes 430 within end caul 100 may enhance the ease of fabricating the end caul 100, as will be discussed further below with regard to FIG. 7.

Illustrative details of the operation of end caul 100 will be discussed with regard to FIG. 5. Assume, for this embodiment, that a laminate of uncured carbon fiber has been laid-up and awaits curing into a composite part.

Figure 5:
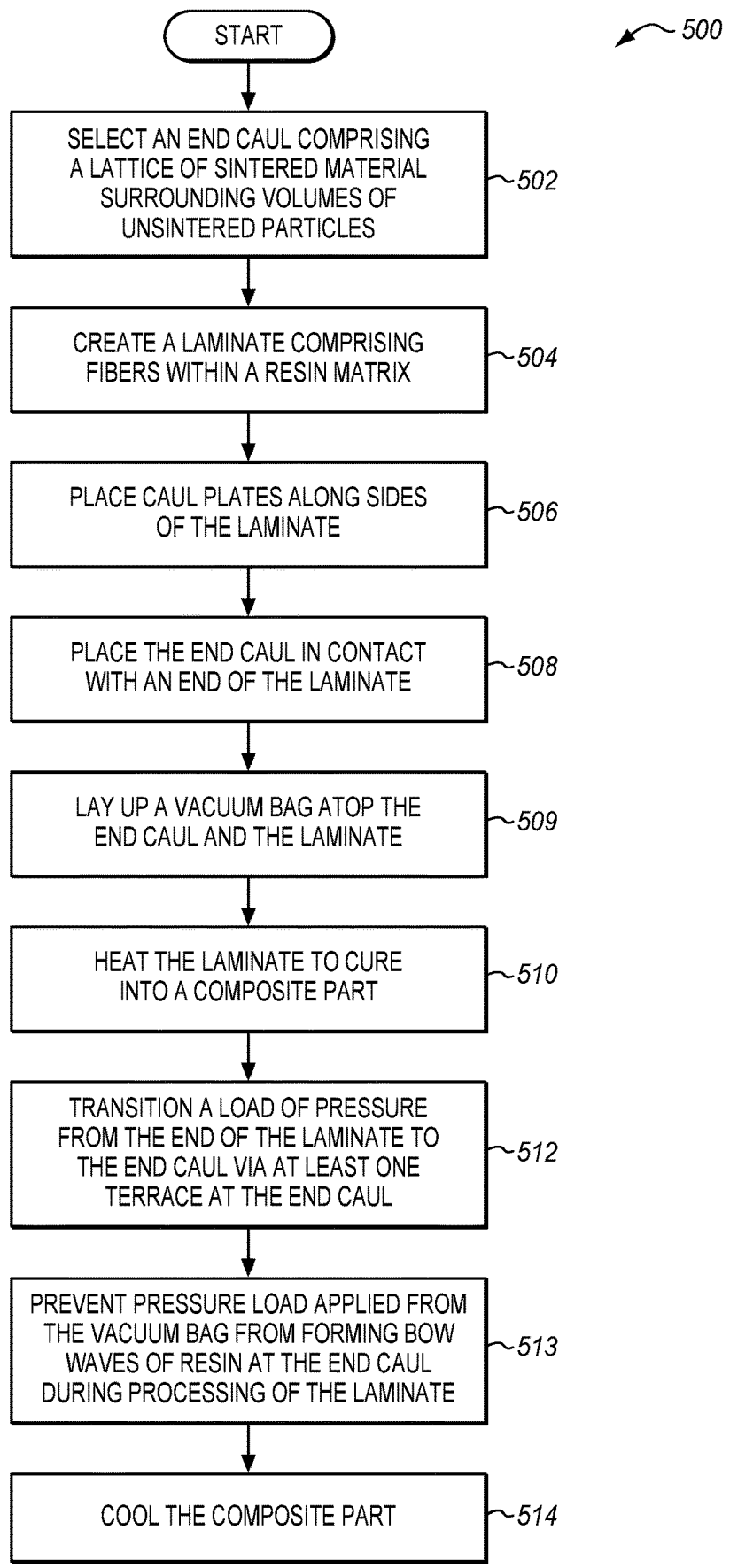
FIG. 5 is a flowchart illustrating a method of fabricating a composite part via a 3D printed end caul in an illustrative embodiment.

FIG. 5 is a flowchart illustrating a method 500 for fabricating a composite part in an illustrative embodiment. The steps of method 500 are described with reference to end caul 100 of FIG. 1, but those skilled in the art will appreciate that method 500 may be performed with other 3D-printed end cauls as desired. The steps of the flowcharts described herein are not all inclusive and may include other steps not shown. The steps described herein may also be performed in an alternative order.

In step 502, an end caul 100 comprising a structure 410 of sintered metal surrounding the volumes 430 of unsintered particles is selected. This provides a benefit in that it prevents overheating during the fabrication process, as will be discussed below. For example, end caul 100 may be picked up and placed into position via an end effector of a robot (not shown), may be chosen based on predefined criteria, etc.

Figure 6:
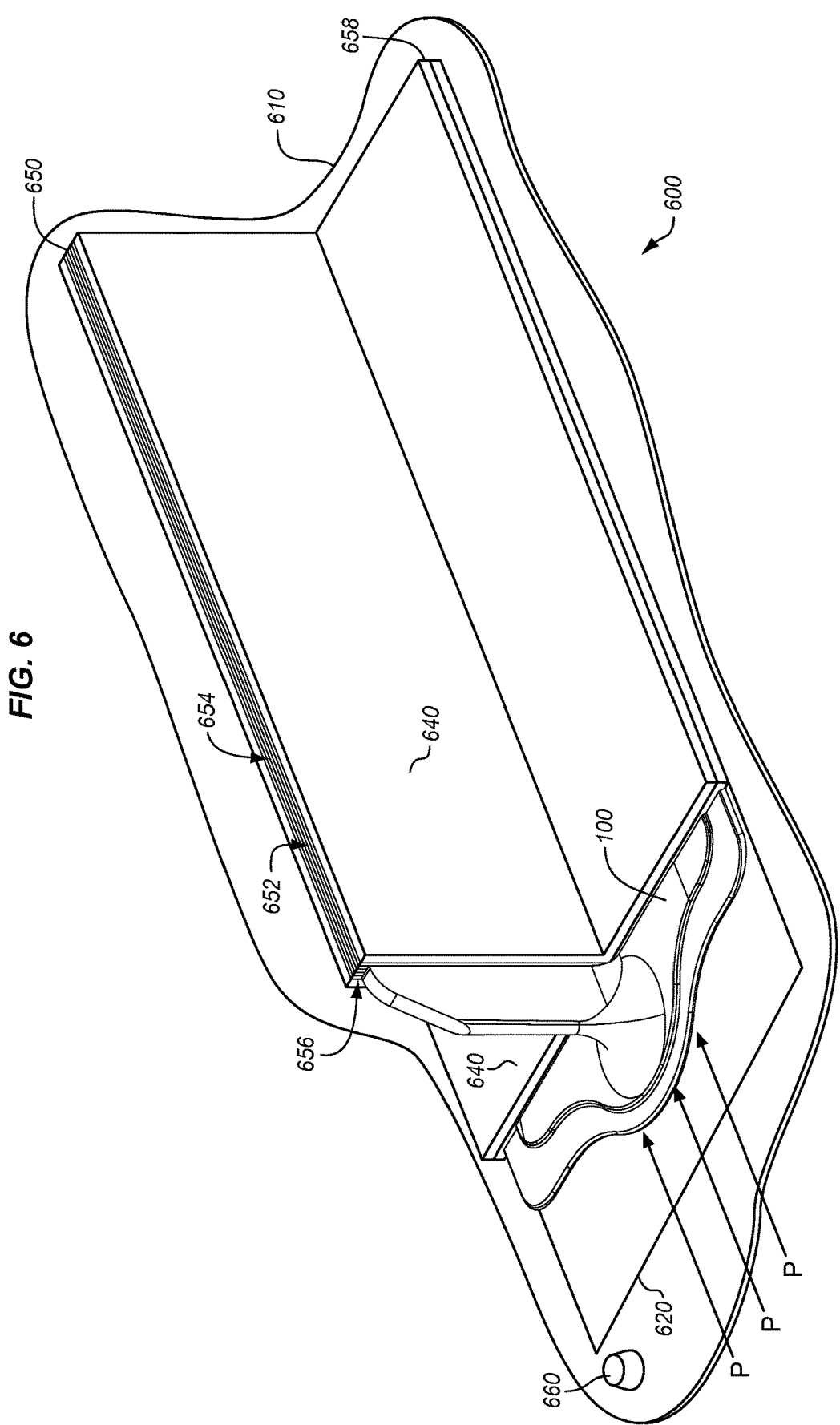
FIG. 6 is a perspective view of a 3D printed end caul being used to fabricate a composite part in an illustrative embodiment.

A laminate comprising fibers within a resin matrix is also created (e.g., laid-up) (step 504). For example, laminate 650 of FIG. 6, comprising resin 652 and fibers 654, may be selected for curing into a composite part. "L" shaped versions of caul plates 640 are placed along sides of laminate 650 (e.g., atop base 658 of laminate 650), in order to provide Outer Mold Line (OML) support to laminate 650 during curing (step 506). Caul plates 640 may also be referred to as "side cauls," because they support the sides of laminate 650. End caul 100 and caul plates 640 provide support and protection of the stringer during the curing process, and prevent high bag tension at the corners of laminate 650 from pushing resin out of laminate 650 or otherwise deforming laminate 650. Furthermore, face 310 of end caul 100 is placed into contact with end 656 of laminate 650 (step 508). This allows pressure load applied to end 656 during curing (e.g., from the vacuum bag impinging on an end of the stringer) to be transferred to end caul 100. With caul plates 640 and end caul 100 placed into contact with laminate 650, additional layup steps may include placing base plate 620 below end caul 100. This process may further include laying up a vacuum bag 610 (which is transparent in this embodiment) atop end caul 100, base plate 620, caul plates 640, and laminate 650 (step 509). After placing vacuum bag 610 and sealing the vacuum bag 610, air may be withdrawn via evacuation port 660 of vacuum bag 610 in order to apply a desired amount of vacuum pressure (e.g., ninety pounds per square inch. For example, an autoclave may be used to increase the pressure above atmospheric pressure.

Steps 510-514 describe processing the laminate 650. Laminate 650 is heated as part of a curing process for a composite part (step 510). For example, in embodiments where resin 652 is a thermoplastic resin, laminate 650 may be heated to a melting temperature. In embodiments where resin 652 is a thermoset resin, laminate 650 may be heated to a curing temperature of the thermoset resin.

During curing, pressure loads (P) indicate application of force to end caul 100 and thereby to the laminate 650. Specifically, pressure loads applied from end 656 of laminate 650 are transferred to end caul 100, via at least one terrace (e.g., terrace 616, terrace 618) at end caul 100 (step 512). Specifically, ridge 112 and ridge 114 act as barriers that catch pressure load applied from vacuum bag 610 (e.g., in the form of creases within vacuum bag 610) from forming bow waves of resin at end caul 100 during processing of the laminate (step 513). End caul helps to prevent wrinkle formation in a vacuum bag, which would otherwise translate into resin distribution issues in the composite structure of laminate 650. The tight radii of ridge 112 and ridge 114 ensure that any warps in vacuum bag 610 caused by such pressure waves will become trapped, instead of traveling to laminate 650. Because wrinkles, creases, etc. are prevented during curing by ridge 112 and ridge 114, vacuum bag 610 does not crease, warp, or otherwise deform the laminate 650 during curing. The resulting composite part formed from laminate 650 is then cooled, and end caul 100, caul plates 640, and vacuum bag 610 may be removed.

Method 500 provides an advantage over prior systems because it utilizes an end caul 100 that is metal and is capable of being rapidly fabricated, is capable of conforming to tight radii of curvature, and is even capable of being modified via additive printing techniques as desired. This provides a combination of durability and functionality that was previously unable to be achieved in end cauls. Having completed a discussion of how the end caul 100 is used during fabrication of a composite part, further discussion focuses on how the end caul 100 may itself be fabricated. While end caul 100 has been illustrated for a "T" configuration blade stringer, further end cauls may form any suitable shapes (e.g., "Z" sections, etc.).

Figure 7:
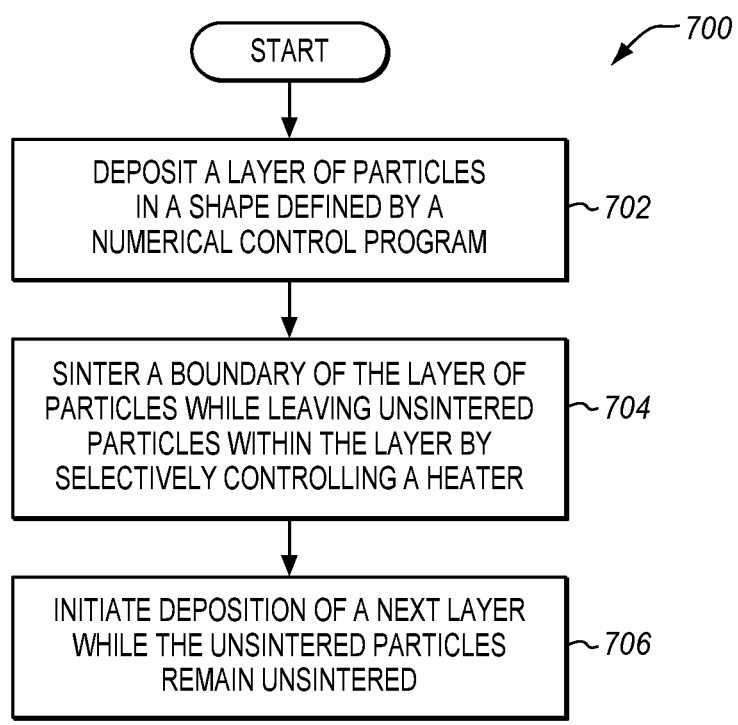
FIG. 7 is a flowchart illustrating a method of fabricating a 3D printed end caul in an illustrative embodiment.

FIG. 7 is a flowchart illustrating a method 700 of fabricating a 3D printed metal end caul (e.g., end caul 100) in an illustrative embodiment. Assume, for this embodiment, that controller 860 of composite fabrication system 800 of FIG. 8 stores a Numerical Control (e.g., NC program 862) with instructions defining how to fabricate end caul 100. Controller 860 may be implemented, for example, as custom circuitry, as a hardware processor executing programmed instructions, or some combination thereof.

Figure 8:
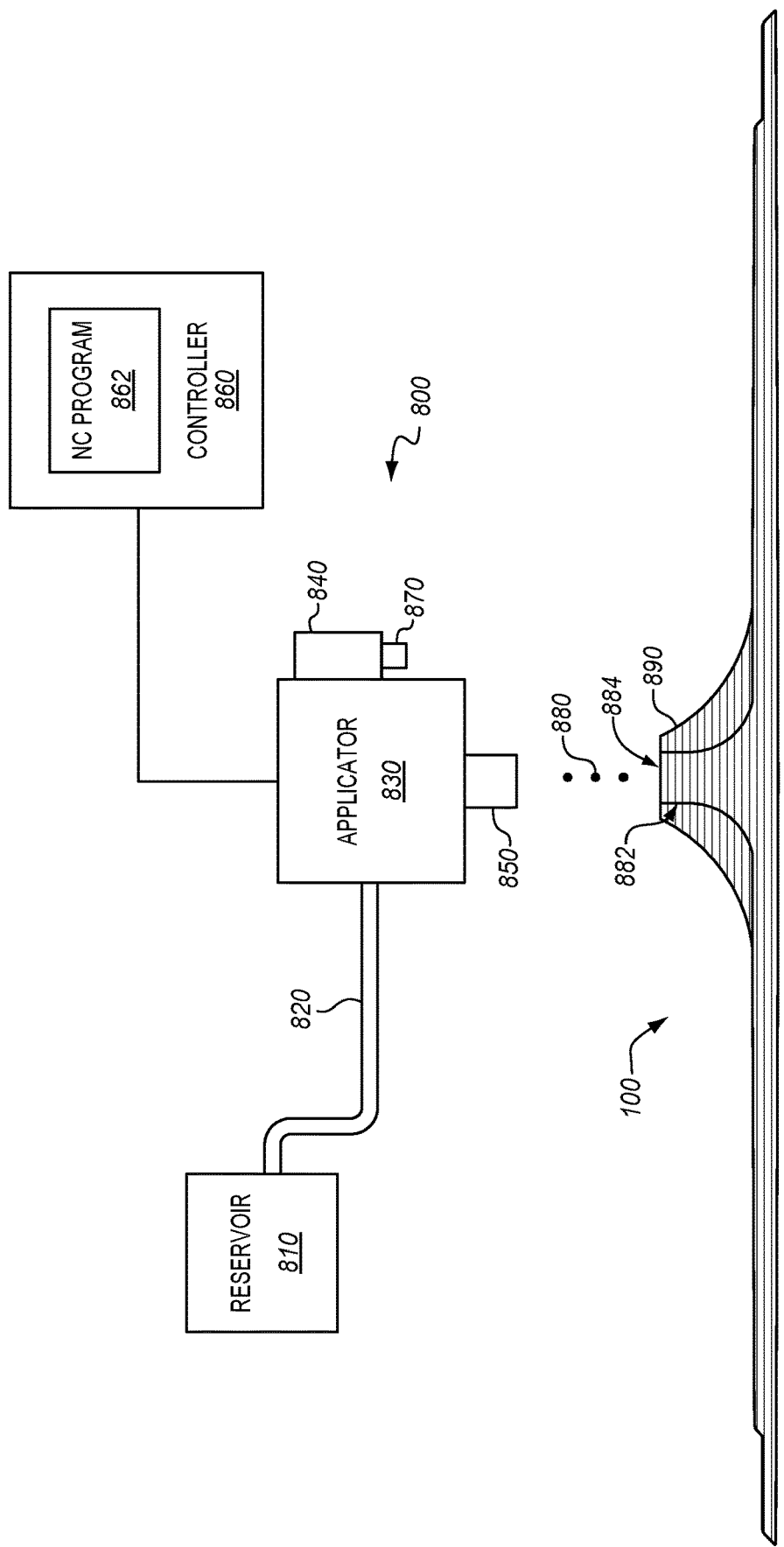
FIG. 8 is a side view of a fabrication system for a 3D printed end caul in an illustrative embodiment.

Method 700 includes depositing a layer 890 of particles 880 of metal in a shape defined by an NC program (e.g., NC program 862) (step 702). For example, as shown in FIG. 8, controller 860 may direct applicator 830 to dispense particles 880 via nozzle 850 at desired locations. In this embodiment, the particles 880 are between thirty micrometers and eighty micrometers in diameter. Applicator 830 may acquire particles 880 via pathway 820 from reservoir 810. In step 704, applicator 830 sinters a boundary of the layer of particles while leaving unsintered particles within the layer. For example, as shown in FIG. 8, applicator 830 may utilize heater 840 to sinter particles 880 in place to form a solid metal wall (i.e., wall 882), while leaving location 884 filled with unsintered metal particles. Whether or not a location is sintered depends on predefined instructions in NC program 862. Controller 860 may for example selectively activate or deactivate heater 840 to cause (or prevent) sintering from taking place. In further embodiments, heat generated during the fabrication of end caul 100 may be detected by a sensor 870. A feedback control loop at NC program 862 may control the sintering process to ensure that heat does not exceed a threshold amount during sintering, for example such that sintering is paused if the threshold amount is exceeded, and then resumed after heat drops below the threshold amount. These techniques may be utilized to create an end caul 100 having a desired shape and strength. This process of leaving certain particles unsintered provides a substantial fabrication benefit, because it reduces heat build up at end caul 100, as well as at applicator 830 during fabrication of end caul 100. If end caul 100 was overheated during fabrication, then various features of end caul 100 could warp or droop, altering the shape of end caul 100 away from what is desired.

Figure 9:
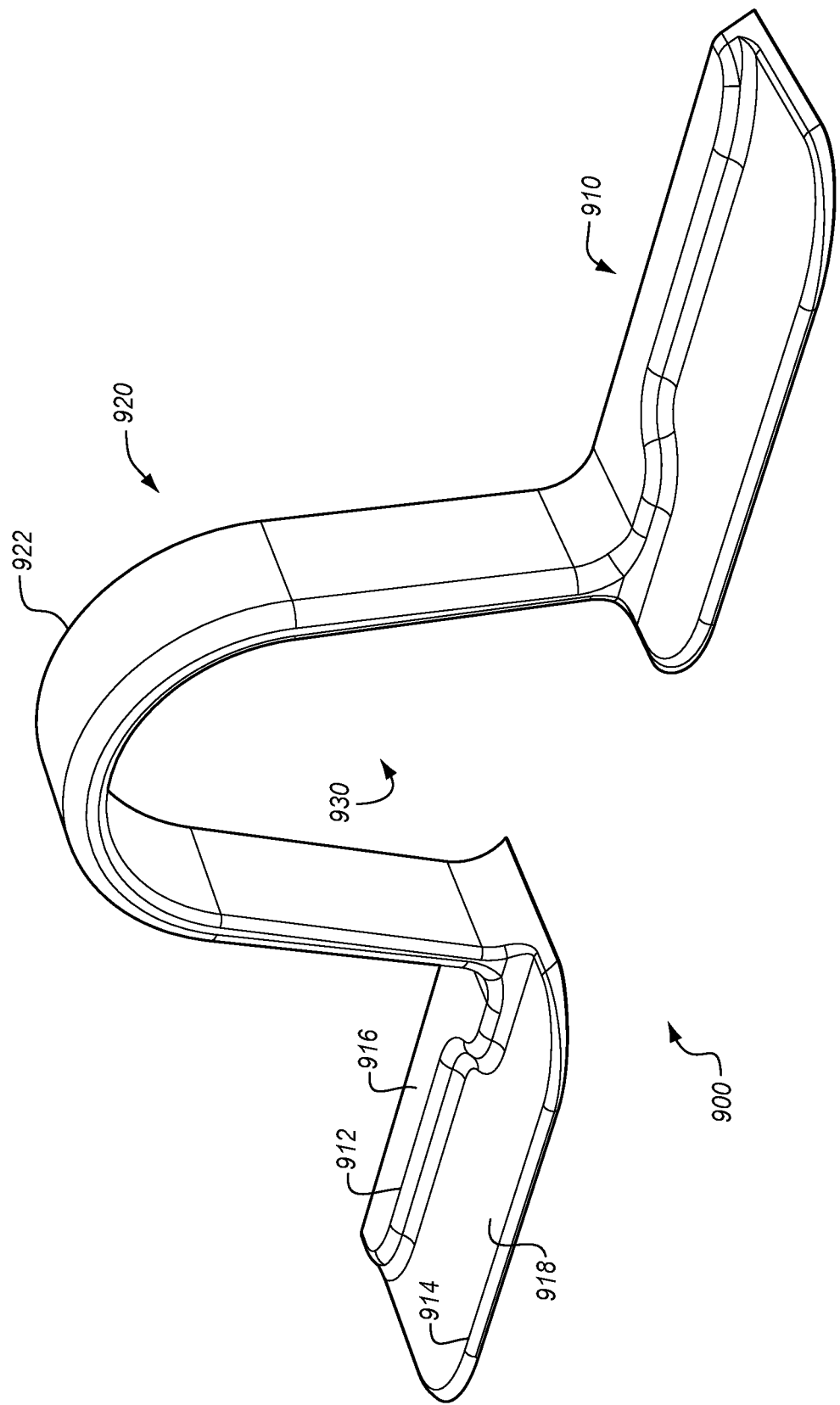
FIG. 9 is a perspective view of a further 3D printed end caul in an illustrative embodiment.

FIG. 9 is a perspective view of a further 3D printed metal end caul (i.e., end caul 900) in an illustrative embodiment. End caul 900 may be utilized to facilitate the fabrication of cap stringers, and match a shape of a composite part. However, bagging and assembly may be different for end caul 900 than an end caul 100, in that end caul 900 may utilize an addition of a mandrel during bagging.

In this embodiment, end caul 900 includes base 910, which includes ridge 912 and ridge 914. The ridge 912 and ridge 914 define terrace 916 and terrace 918. End caul 900 further includes a vertical element in the form of arch 920, including upper surface 922, which is curved. Arch 920 corresponds with an end profile of a laminate that will be cured into a cap stringer. In this embodiment, the combination of radius step down features provided by ridge 912 and ridge 914 serve to distribute load from bag pressure. Hence, bow waves are reduced, and the ridges catch any distortions or bow waves (e.g., found as creases in a vacuum bag) that would otherwise travel from an edge of a vacuum bag into the laminate, or potentially even cause tears in the vacuum bag. This helps to reduce markoff into the laminate when compared to designs that lack multiple ridges. In FIG. 9, upper surface 922 has a uniform thickness and is empty underneath arch 920, because there is no corresponding material in the laminate for end caul 900 to support. In short, end caul 100 is shaped to protect the laminate from undesirable effects caused by the vacuum bags during application and use.

EXAMPLES

In the following examples, additional processes, systems, and methods are described in the context of an end caul for facilitating fabrication of composite parts.

Figure 10:
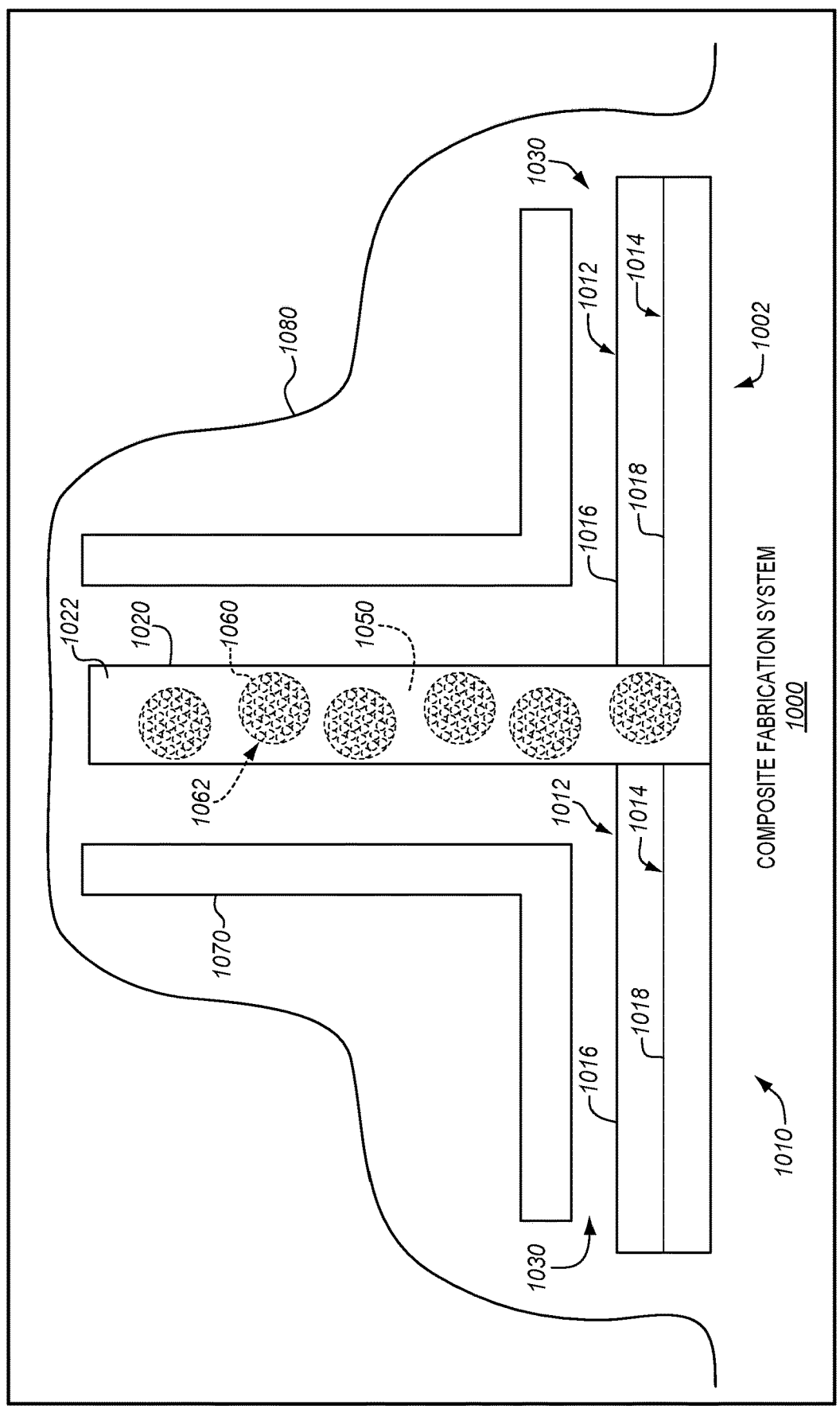
FIG. 10 is a block diagram of a 3D printed end caul in an illustrative embodiment.

FIG. 10 is a block diagram of a composite fabrication system 1000 in an illustrative embodiment. In this embodiment, composite fabrication system 1000 includes end caul 1002 which is located on the ends of a laminate, caul plates 1070 which are disposed at sides of the laminate, and vacuum bag 1080. Caul plates 1070 help to ensure outer mold line compliance along the laminate, and need not be additively manufactured. End caul 1002 includes base, which forms flanges 1030. Each flange 1030 includes ridge 1012 and ridge 1014, which define terrace 1016 and terrace 1018. Ridge 1012 and ridge 1014 "catch" deformations in vacuum bag 1080 which could otherwise travel into a laminate. End caul 1002 further includes web 1020, which includes curved upper surface 1022. Curved upper surface 1022 is curved to prevent a vacuum bag placed on web 1020 from rupturing or tearing when vacuum is applied. Internal to the structure of end caul 1002 are structure 1050 of sintered metal, and volumes 1060 of unsintered metal particles 1062. During operation, end caul 1002 may be placed against an end of a laminate in order to receive pressure loads and other forces that may warp or damage the laminate during curing into a composite part. End caul 1002 is held in place during curing by pressure applied via vacuum bag 1080 and vacuum pressure application.

Figure 11:
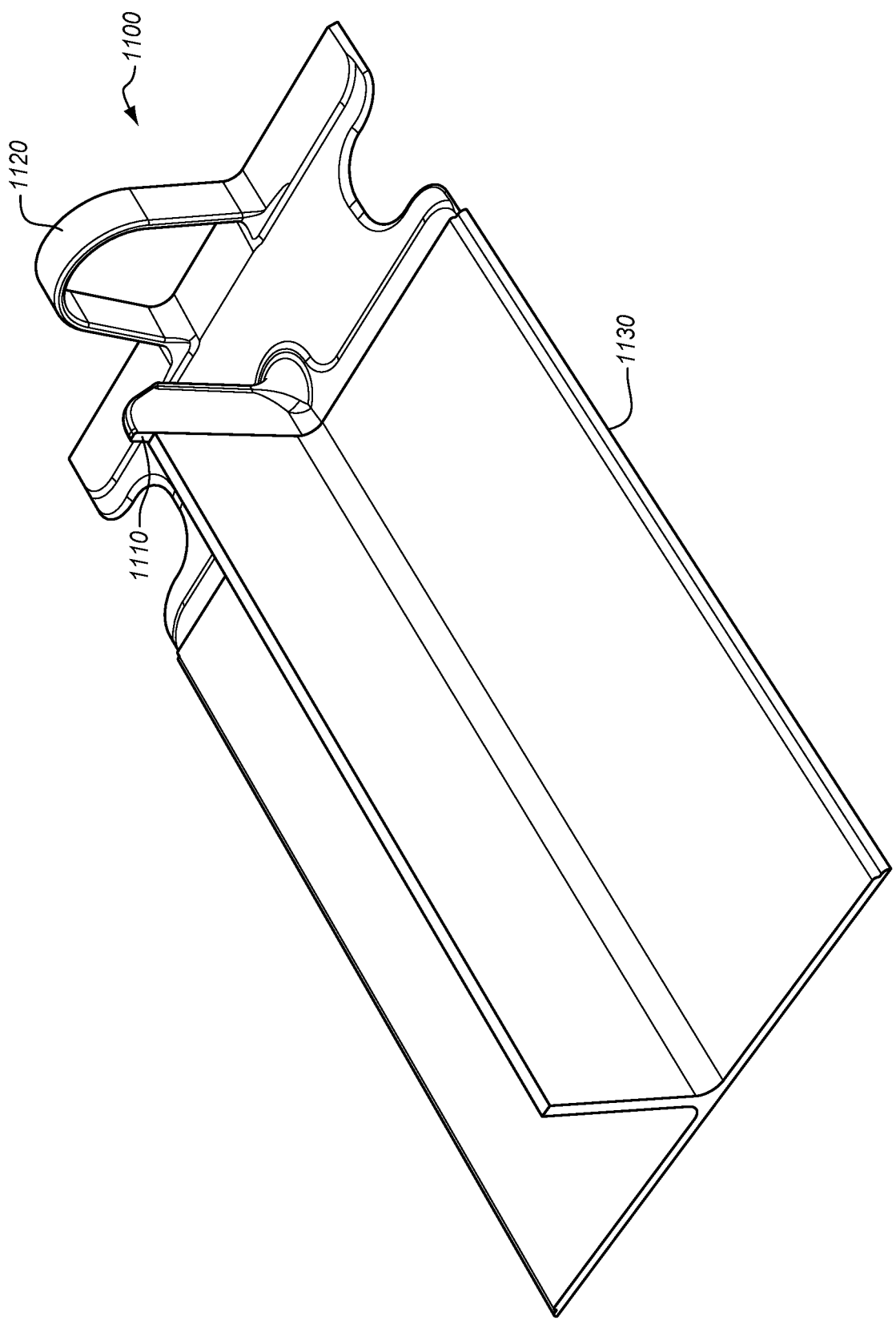
FIGS. 11-12 are perspective views of a further 3D printed end caul in an illustrative embodiment.
Figure 12:
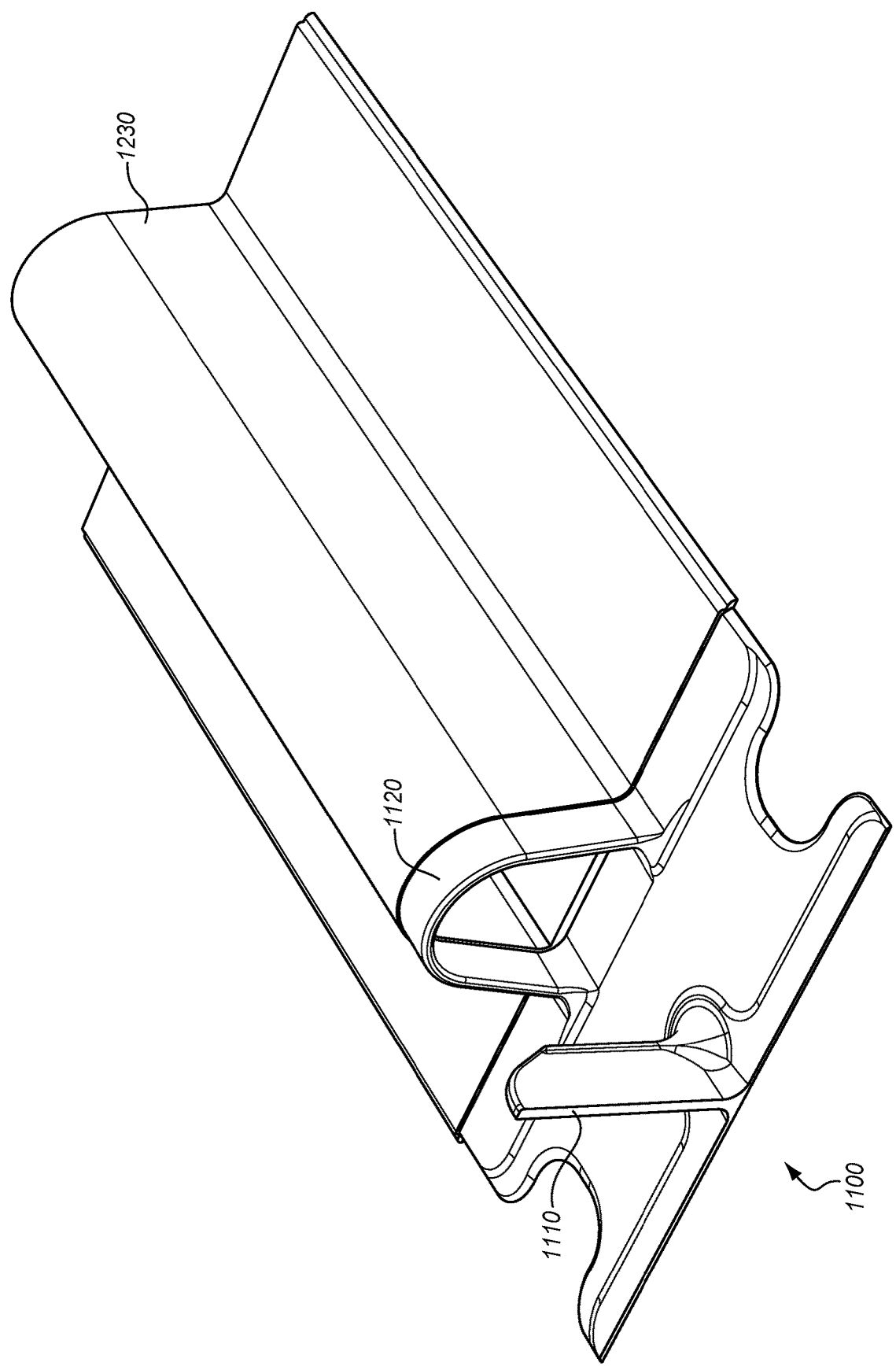

FIGS. 11-12 are perspective views of a further 3D printed end caul (e.g., end caul 1100) in an illustrative embodiment. End caul 1100 includes blade end 1110, for supporting a laminate 1130. End caul 1100 also includes arch end 1120 for supporting a laminate 1230.

Figure 13:
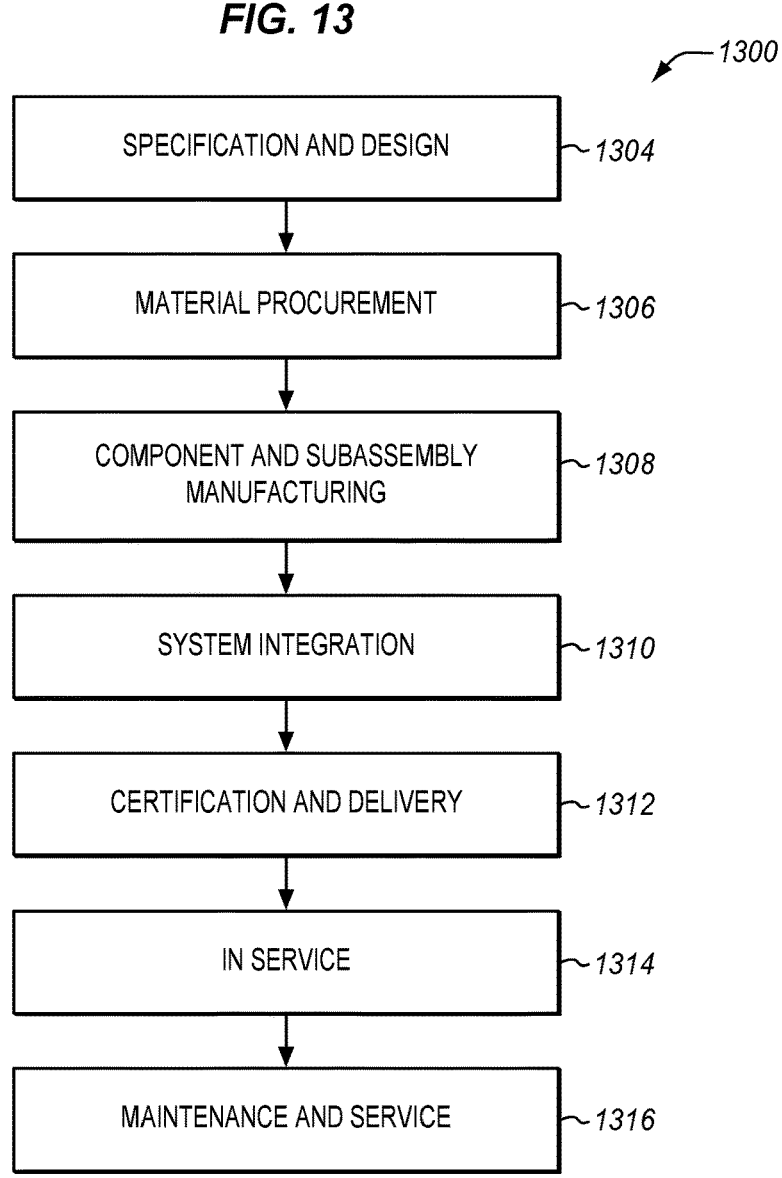
FIG. 13 is a flow diagram of aircraft production and service methodology in an illustrative embodiment.
Figure 14:
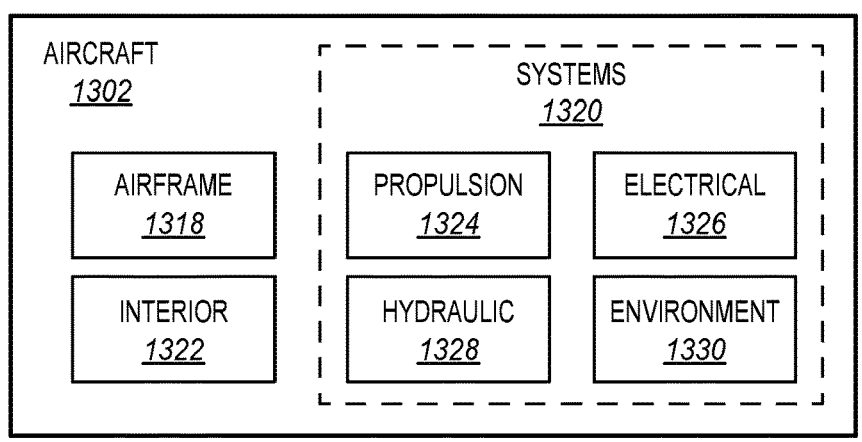
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
an end caul for supporting a laminate during curing of the laminate into a composite part, the end caul comprising:
   a base that contacts a portion of the laminate and includes ridges which prevent bow waves from forming in the laminate during curing of the laminate; and
   a vertical element that projects outward from a terrace at the base and includes a curved upper surface,
   wherein the base and the vertical element comprise a structure of sintered material that delimits discrete internal volumes which each are filled with unsintered particles, and the internal volumes form a staggered configuration through a thickness of the vertical element.

2. The apparatus of claim 1 wherein:
the end caul is divided by the ridges into multiple terraces that disperse pressure from the laminate into the end caul to prevent deformation of the laminate, wherein the terrace comprises one of the multiple terraces, and is formed atop at least one of the multiple terraces.

3. The apparatus of claim 1 wherein:
the unsintered particles are between thirty micrometers and eighty micrometers in diameter.

4. The apparatus of claim 1 wherein:
the volumes of the unsintered particles are between two and five millimeters in diameter.

5. The apparatus of claim 1 wherein:
a taper angle of the curved upper surface is between thirty and forty-five degrees.

6. The apparatus of claim 1 wherein:
a first group of the internal volumes are closer to a first wall of the vertical element than are a second group of the internal volumes.

7. A system comprising:
caul plates disposed atop a laminate, the laminate comprising fibers within a resin matrix;
an end caul for supporting a laminate during curing of the laminate into a composite part, the end caul comprising:
   a base that contacts a portion of the laminate and includes ridges which prevent bow waves from forming in the laminate during curing of the laminate; and
   a web that projects outward from a terrace at the base and includes a curved upper surface,
   wherein the base and the web comprise a structure of sintered material that delimits discrete internal volumes which each are filled with unsintered particles, wherein the internal volumes form a staggered configuration through a thickness of the web; and
a vacuum bag disposed atop the caul plates and the end caul that includes an evacuation port which removes air during curing of the laminate.

8. The apparatus of claim 1 wherein:
the volumes are each between two millimeters and five millimeters in diameter.

9. The system of claim 1 wherein:
the end caul further comprises fillets that provide a smooth transition from the base to the vertical element.

10. The system of claim 2 wherein:
the ridges are curved.

11. The system of claim 1 wherein:
the end caul comprises a material selected from the group consisting of ceramic and metal.

12. The system of claim 1 wherein:
the end caul includes an arch that corresponds with an end profile of the laminate.

13. The system of claim 1 wherein:
the vertical element comprises an arch that has a uniform thickness.

14. The system of claim 7 wherein:
the volumes are each between two millimeters and five millimeters in diameter.

15. The system of claim 7 wherein:
the end caul further comprises fillets that provide a smooth transition from the base to the web.

16. The system of claim 7 wherein:
the ridges divide the base into multiple terraces, wherein the terrace comprises one of the multiple terraces, and is formed atop at least one of the multiple terraces.

17. The system of claim 7 wherein:
the end caul comprises a material selected from the group consisting of ceramic and metal.

18. The system of claim 7 wherein:
the end caul includes an arch that corresponds with an end profile of the laminate.

19. The system of claim 7 wherein:
the vertical element comprises a web that has a uniform thickness.

20. The system of claim 7 wherein:
the end caul comprises aluminum.

* * * * *